United States Patent
Ganzert

(10) Patent No.: US 7,181,385 B2
(45) Date of Patent: Feb. 20, 2007

(54) PROCESS FOR DISTRIBUTION OF A PROGRAM CODE TO A PLURALITY OF MEASURING INSTRUMENTS

(75) Inventor: Johannes Ganzert, Müchen (DE)

(73) Assignee: Rohde & Schwarz GmbH & co. kg, Munich (DE)

( * ) Notice: Subject to any disclaimer, the term of this patent is extended or adjusted under 35 U.S.C. 154(b) by 738 days.

(21) Appl. No.: 09/963,613

(22) Filed: Sep. 27, 2001

(65) Prior Publication Data

US 2002/0046233 A1 Apr. 18, 2002

(30) Foreign Application Priority Data

Oct. 12, 2000 (DE) ................. 100 50 546

(51) Int. Cl.
*G06F 9/45* (2006.01)
(52) U.S. Cl. ................. 703/22; 703/22; 703/24; 703/26; 717/177; 717/178; 717/168
(58) Field of Classification Search ................. 703/21, 703/22; 714/32; 717/178, 177, 168
See application file for complete search history.

(56) References Cited

U.S. PATENT DOCUMENTS

| | | | | |
|---|---|---|---|---|
| 4,397,021 A | * | 8/1983 | Lloyd et al. ................. 714/33 |
| 4,736,374 A | * | 4/1988 | Kump et al. ................. 714/32 |
| 5,754,863 A | * | 5/1998 | Reuter ................. 717/173 |
| 6,021,276 A | * | 2/2000 | Demke et al. ................. 717/178 |
| 6,263,491 B1 | * | 7/2001 | Hunt ................. 717/130 |
| 6,311,149 B1 | * | 10/2001 | Ryan et al. ................. 703/21 |
| 6,363,507 B1 | * | 3/2002 | Truebenbach et al. ................. 714/734 |
| 6,715,068 B1 | * | 3/2004 | Abe ................. 713/1 |
| 6,728,956 B2 | * | 4/2004 | Ono ................. 717/168 |
| 7,051,327 B1 | * | 5/2006 | Milius et al. ................. 717/177 |

FOREIGN PATENT DOCUMENTS

JP KR2002022984 A * 3/2002

OTHER PUBLICATIONS

"Will Measurement Instruments Turn into Agents?", Dobrowiecki et al, IEEE Instrumentation and Measurement Conference, Jun. 1996.*
Overview of IEEE-488, anonymous, 1999.*
"Developing Distributed GPIB Test Systems Using GPIB-ENET/100 and Existing Ethernet Networks" Humphrey et al, National Instruments, Application Note 103, Jun. 2000.*
"Left to its own Devices APL Plots on the Bus", APL Quote Guad, ACM 0-89791-478-3, ACM 1992.*

* cited by examiner

*Primary Examiner*—Fred Ferris
(74) *Attorney, Agent, or Firm*—Birch, Stewart, Kolasch & Birch, LLP

(57) ABSTRACT

A method for distributing a program code to a plurality of measuring instruments, each of which is coupled to a control computer respectively via a second bus wit the control computer being coupled to a central computer via a first bus which is, in turn, coupled with a storage-medium reading device and/or an inter-regional network. In this respect, the program code is fed to the central computer by placing a storage medium on which the program code is stored in the storage-medium reading device or by transmitting the program code via the inter-regional network. The program code is transmitted from the central computer to the control computers over the second bus. The control computers transmit the program code via the first bus to the coupled measuring instruments.

20 Claims, 1 Drawing Sheet

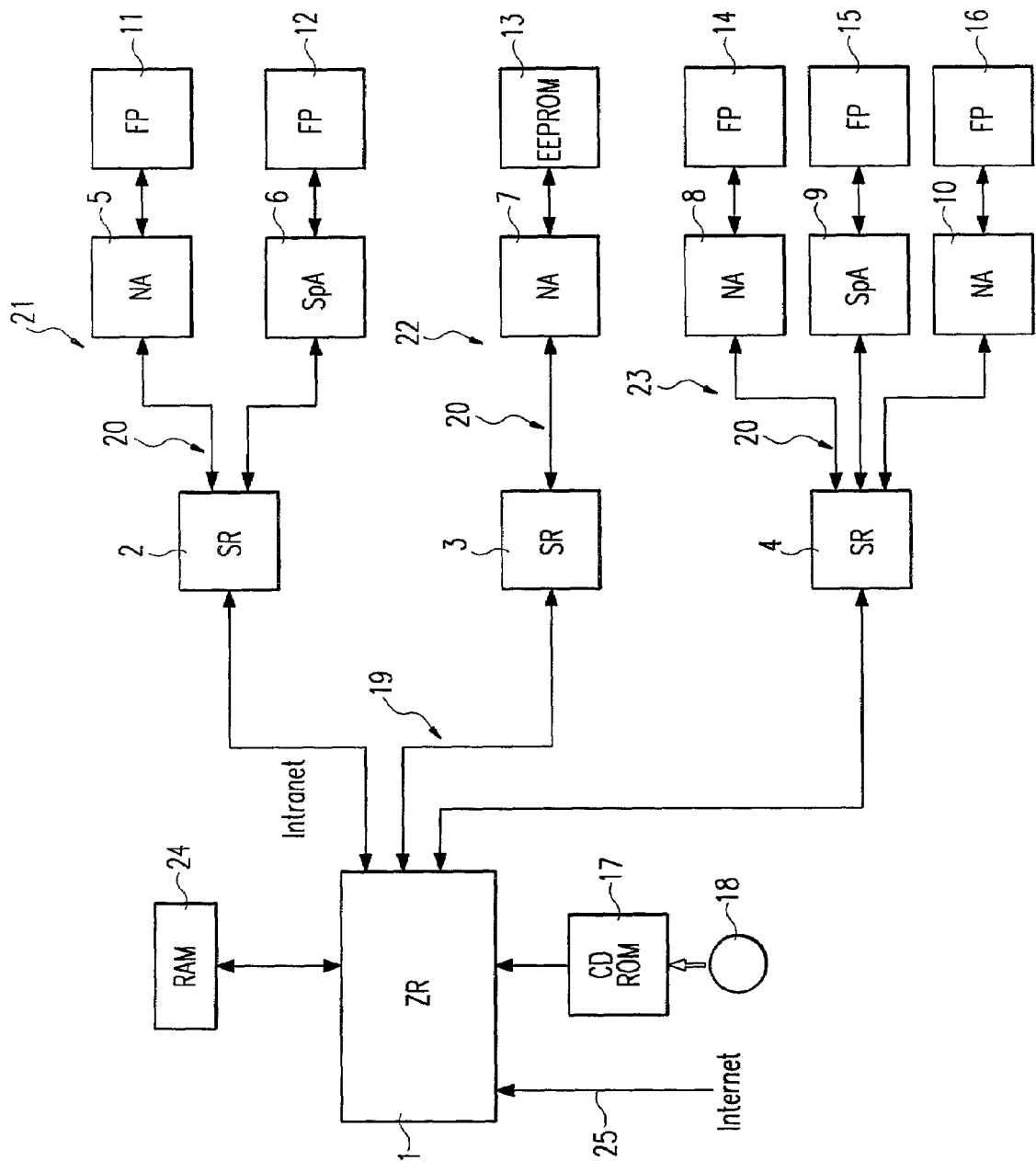

PROCESS FOR DISTRIBUTION OF A PROGRAM CODE TO A PLURALITY OF MEASURING INSTRUMENTS

BACKGROUND OF THE INVENTION

This application claims a foreign priority from German patent application 100 50 546.5, and the contents of this priority application are incorporated herein by reference.

The invention concerns a process for distribution of a program code to a plurality of measuring instruments.

Measuring instruments, for example a network analysator network analyzer), a spectrum analyzer or a signal generator, are normally run on a control computer and are coupled to the control computer via a local bus system, for example an IEC-bus, a LAN-bus or a serial interface. There is a measuring routine on the control computer that controls the measuring sequence of operation and transmits individual measuring instructions to the measuring instruments and calls up the measured data from the measuring instruments. Various measuring functions are stored in the measuring instruments themselves as firmware, which can be periodically updated by the measuring-device manufacturer to make available to the customer, for example, new measuring functions, new error-correction functions or the like, or to switch to the customer new options of the measuring instrument.

A customer of a measuring-device manufacturer often has a plurality of control computers and a plurality of measuring instruments coupled thereto. When updating the firmware (software or data of the manufacturer) it has been necessary until now for the manufacturer of the measuring instruments to send to the customer a storage medium in the form of a CD-ROM, for example, and for the customer to insert this storage medium in each of its measuring instruments and to transmit the program code of the new firmware to a local storage medium of the measuring instrument. Alternatively, it has also been possible for the measuring-device manufacturer to ship to every customer as many storage mediums, that is, for example, as many CD-ROMs as there are operating measuring instruments. This procedure has been relatively inconvenient and demands that the measuring instruments each be provided with a storage-medium reading device. Sometimes, the measuring instruments of a customer are also in a measuring environment that leads to a quick contamination of the storage-medium reading device so that a storage medium reading device on the measuring instrument can not be durably operated, rather it must be installed just for transmitting the new firmware.

It is an object of this invention to provide a method for distributing a program code to a plurality of measuring instruments that is particularly uncomplicated and cost effective and that does not require a storage-medium reading device on a measuring instrument.

SUMMARY OF THE INVENTION

According to principles of this invention, a method for distributing a program code to a plurality of measuring instruments that are respectively coupled with a control computer via a respective first bus, with the control computer being coupled with a central computer via a second bus, the central computer being coupled with one of a storage-medium reading device and an inter-regional network, includes the method steps of: feeding the program code to the central computer by one of placing a storage medium on which the program code is stored in the storage-medium reading device or by transferring the program code to the central computer via the inter-regional network; transmitting the program code from the central computer via the second bus to at least one control computer; and transmitting the program code from each control computer that received the program code, via the first bus, to the coupled measuring instruments. Further enhancement are also described and claimed herein.

The invention is based on a recognition that instead of furnishing the measuring instruments with storage mediums having a new program code of the firmware loaded thereon in a decentralized manner, it is more rational to supply these storage mediums only to a central computer of a respective customer. The program code of the firmware is then transmitted over an internal intranet of the customer to the control computers of the individual measuring structures that, in turn, are connected to the measuring instruments by a measuring bus. For each customer of the measuring-device manufacturer it is therefore only necessary to load the storage medium, for example a CD-ROM, one time in his central computer, with the firmware to be brought up-to-date then being automatically transmitted to all measuring instruments in this installation. Alternatively, it is also possible for a measuring-device manufacturer to transmit the program code for updating firmware via the internet to the central computer of each of its customers with transmission of the program code then taking place over the customers' internal intranet to the control computers and from there via a measuring bus to the individual measuring instruments.

BRIEF DESCRIPTION OF THE DRAWINGS

The invention is described and explained in more detail with reference to the drawing. The described and drawn features can be used individually or in preferred combinations in other embodiments of the invention. The foregoing and other objects, features and advantages of the invention will be apparent from the following more particular description of the invention, as illustrated in the drawing in which reference characters refer to the same parts throughout. The drawing is not necessarily to scale, emphasis instead being placed upon illustrating principles of the invention in a clear manner.

The only FIGURE of the drawing is a block diagram of an embodiment of the method of this invention.

DETAILED DESCRIPTION OF THE INVENTION

The drawing FIGURE shows a typical intra-networking structure of a customer of a measuring-device manufacturer. A central computer 1 is coupled via a second bus 19, for example a customer internal intranet or a LAN-bus, with a plurality of control computers 2, 3 and 4. The control computers 2, 3 and 4 respectively control different measuring systems 21, 22 and 23, with a control routine suitable for a measuring task stored in the control computers 2–4. The control computers 2, 3 and 4 are coupled with a plurality of measuring instruments 5–10 via a first bus 20, for example an IEC-bus or a LAN-bus or a serial interface, for example an RS232-interface. In the shown embodiment the first control computer 2 is coupled with the second measuring instruments 5 and 6, with the measuring instrument 5 being, for example, a network analysator and the measuring instrument 6 being, for example, a spectrum analyzer. In the shown embodiment the control computer 3 is only coupled with one measuring instrument 7, for example, a network analysator. Contrary to this, the control computer 4 is coupled with measuring instruments 8, 9 and 10, for example, two network analysators 8 and 10 and one spectrum analyzer 9. The control computers 2, 3 and 4 are positioned close to the therewith-associated measuring instruments 5, 6 and 7 and 8–10, while the central computer 1 can be located a large spatial distance from the control computers 2–4. The measuring instruments 5–10 are each coupled to a local memory 11–16, with, in the embodiment shown, the local memories 11, 12, 14, 15 and 16 being hard drives, or fixed discs, while the local memory 13 is an EEPROM. The program code of the firmware of the associated measuring instrument 5–10, which contains the functionality of the measuring instrument and, for example, the instruction set, measuring procedures or error correction procedures is stored in the respective local memory 11–16.

According to a first variant of the method of this invention, in order to update the program code of the firmware in the local memories 11–16 an appropriate storage medium 18, for example a CD ROM is placed in a corresponding storage-medium reading device 17, for example a CD-ROM-drive. This storage medium 18 is sent to the appropriate customer in a normal shipping. The respective program codes for updating the firmware of the measuring instruments 5–10 is then transmitted via the second bus 19, in this embodiment the customer's internal intranet, to the control computers 2–4. The next time the respective measuring system associated with the particular control computer 2, 3 or 4 is placed in operation, each control computer 2, 3 or 4 transmits the respective program code to the measuring instruments 5, 6 or 7 or 8–10 that are coupled to it.

The program code is only transmitted to the particular measuring instrument for which it is intended. If the program code contains, for example, an updating only the firmware of only the network analysators NA, the control computer 2 transmits this program code to the network analysator 5, the control computer 3 to the network analysator 7 and the control computer 4 to the network analysators 8 and 10. If the program code concerns an updating of the firmware of the spectrum analyzer SpA, the control computer 2 transmits this program code to the spectrum analyzer 6 and the control computer 4 to the spectrum analyzer 9. The control computer 3, which is not coupled to a spectrum analyzer SpA, does not further transmit the program code.

The program code can, for example, include an addressing in a header from which it can be derived for what type of measuring instrument (in the disclosed embodiment a network analysator NA or spectrum analyzer SpA) that this program code is intended. The control computer 2, 3 or 4 then transmits the program code only to the particularly addressed measuring instruments.

Further, a list can be placed in a memory 24 of the central computer 1 that lists for each control computer 2, 3 or 4 the particular type of measuring apparatus (in the disclosed embodiment a network analysator NA or a spectrum analyzer SpA) that are coupled with the respective control computer 2, 3 or 4. The central computer 1 transmits then the program codes only to the control computer 2 or 3 or, if it is coupled to a measuring instrument corresponding to the program code. For example, the central computer 1 in the shown embodiment transmits a program code, which is particularly for the spectrum analyzer only to the control computers 2 and 4. To update this list, the control computers 2, 3 and 4 can provide information to the central computer 1 via the second bus 19 from which it can be determined the type of measuring instruments (in the disclosed embodiment network analysators NA or spectrum analyzers SpA) are coupled to these respective control computers. This information can be transmitted when the measuring system 21 or 22 or 23 is first placed in operation, and can be renewable transmitted when additional measuring instruments are coupled to or removed from the respective control computers 2, 3 or 4.

In another variant of the method of this invention the program code of the firmware to be updated is not fed to the central computer 1 via a storage medium 18, rather it is fed thereto via the Internet 25. This saves the measuring-device manufacturer from shipping the storage medium 18 to the customer. When updating firmware of a measuring instrument sold by a measuring manufacturer, the measuring-device manufacturer sends to the respective customers that obtained such a measuring instrument of this type from him over the Internet 25 the appropriate program code to update the respective measuring instrument 5–10. This program code is further relayed via the second bus 19 to the control computers 2, 3 or 4 and via the first bus 20 to the measuring instruments 5, 7, 8, 10 or 6, 9 targeted, or addressed, by the program code as described above.

I claim:

1. A system for distributing instrument firmware program update, comprising:
    a central computer configured to receive the program update;
    a plurality of control computers connected to the central computer, the plurality of control computers including a first control computer; and
    a plurality of instruments, wherein
    each instrument is coupled to only one of the plurality of control computers,
    the first control computer is coupled to at least two different instruments,
    the central computer is configured to transfer the program update to at least one of the control computers including the first computer, and
    the first computer, upon receipt of the program update, is configured to transfer the program update to one of the at least two different instruments coupled to the first control computer without transferring the program update to another one of the at least two different instruments.

2. The system of claim 1, wherein the central computer is configured to receive the program update through a memory media or through a network.

3. The system of claim 1, wherein each instrument includes a local memory and the each of the plurality of control computers is configured to download the program update to the local memory.

4. The system of claim 1, wherein
    the program update is intended for an instrument identical to the one of the at least two different instruments, and
    the central computer is configured to transfer the program update only to those control computers to which the instrument identical to the one of the at least two different measuring instruments is coupled.

5. The system of claim 4, wherein the central computer maintains information regarding instrument type and coupling of each of the plurality of instruments to the plurality of control computers.

6. The system of claim 5, wherein each of the plurality of the control computers is configured to provide the central computer with information regarding instruments coupled the control computer.

7. The system of claim 4, wherein the central computer is configured to determine the instrument identical to the one of the at least two different instruments for the program update based on an addressing information included in the program update.

8. The system of claim 1, wherein the program update is intended for execution by an updated instrument.

9. The system of claim 1, wherein the control computers includes a second computer coupled to at least one of the plurality of instruments, the at least one of the plurality of instruments being non-identical to the one of the at least two different instruments, the central computer being configured to not transfer the program update to the second control computer.

10. A method for distributing instrument firmware program code to a plurality of measuring instruments, each measuring instrument being respectively coupled to only one of control computers via a respective first bus, with each of the control computers being coupled to a central computer via a second bus, the central computer being coupled with at least one of a storage-medium reading device and an inter-regional network, a first control computer of the control computers being coupled to at least two different measuring instruments, said method comprising:
   supplying the program code to the central computer by at least one of placing a storage medium on which the program code is stored in the storage-medium reading device and transmitting the program code to the central computer via the inter-regional network;
   transmitting the program code from the central computer via the second bus to at least one of the control computers including the first computer;
   transmitting the program code from the first control computer to one of the at least two different measuring instruments coupled to the first control computer without transmitting the program code from the at least one of the control computers to another one of the at least two different measuring instruments; and
   updating a measuring routine of a firmware of the one of the at least two different measuring instruments coupled to the first control computer.

11. The method of claim 10, wherein a second control computer of the control computers is coupled to at least one of the plurality of measuring instruments, the at least one of the plurality of measuring instruments being non-identical to the one of the at least two different measuring instruments, the step of transmitting the program code from the central computer to at least one of the control computers including transmitting the program code from the central computer to the first control computer without transmitting the program code to the second control computer.

12. The method of claim 10, wherein the first bus is a measuring bus or a serial interface.

13. The method of claim 10, wherein the second bus is an intranet over which the control computers are coupled with the central computer.

14. The method of claim 10, wherein the inter-regional network is the Internet.

15. The method of claim 10, wherein the storage-medium reading device is a CD-ROM reading device.

16. The method of claim 10, further comprising:
   determining for which type of a measuring instrument the program code is intended based on a target address contained in the program code.

17. The method of claim 10, further comprising:
   providing coupling information of each of the plurality of measuring instruments coupled to the control computers to a memory of the central computer; and
   wherein in the step of transmitting the program code from the central computer to at least one of the control computers, transmitting the program code based on a targeting information in the program code and the coupling information in the memory of the central computer.

18. The method of claim 10, further comprising:
   transmitting from the control computers to the central computer types of measuring instruments coupled to the control computers.

19. The method of claim 10, further comprising executing the program code through the measuring instrument.

20. The method of claim 10, further comprising transmitting the program code from the first control computer to another measuring instrument coupled to the first control computer, the another measuring instrument being identical to the one of the at least two different measuring instruments.

* * * * *